United States Patent
Miller

(10) Patent No.: US 6,526,850 B1
(45) Date of Patent: Mar. 4, 2003

(54) JACK BIT FOR ACTUATING SCISSOR JACKS ON TRAILERS

(76) Inventor: Darrell Lee Miller, P.O. Box 4121, Kingman, AZ (US) 86402-4121

( * ) Notice: Subject to any disclaimer, the term of this patent is extended or adjusted under 35 U.S.C. 154(b) by 0 days.

(21) Appl. No.: 09/957,978

(22) Filed: Sep. 21, 2001

(51) Int. Cl.$^7$ .............................................. B25B 23/16
(52) U.S. Cl. .................... 81/177.2; 254/1; 254/DIG. 3
(58) Field of Search .............................. 254/1, DIG. 3; 81/177.2, 121.1

(56) References Cited

U.S. PATENT DOCUMENTS

| | | | |
|---|---|---|---|
| 1,741,810 A | * 12/1929 | Bidal | ......................... 81/177.2 |
| 3,451,655 A | 6/1969 | Scott | |
| 4,720,219 A | 1/1988 | Masonek | |
| 4,749,169 A | 6/1988 | Pickles | |
| 4,872,230 A | 10/1989 | Levine | |
| 4,943,034 A | 7/1990 | Wagnon | |
| 5,048,378 A | 9/1991 | Nikolas | |
| 5,161,782 A | 11/1992 | Huang | |
| 5,303,898 A | 4/1994 | Engez | |
| 5,477,758 A | * 12/1995 | Cunningham | ............... 81/177.2 |
| 5,638,577 A | * 6/1997 | Gooding et al. | ......... 81/177.85 |
| 5,657,964 A | 8/1997 | Yoshida | |
| 5,707,043 A | 1/1998 | Yoshida | |
| 5,771,516 A | 6/1998 | Huang | |
| 5,865,499 A | 2/1999 | Keyser | |
| 5,897,121 A | 4/1999 | Case | |
| 5,899,124 A | * 5/1999 | Cross, Jr. | ................... 81/177.2 |
| 5,950,990 A | 9/1999 | Castillo | |
| 5,975,497 A | 11/1999 | Few | |
| 6,237,894 B1 | * 5/2001 | Cotner et al. | .......... 254/DIG. 3 |

* cited by examiner

Primary Examiner—Eileen P. Morgan
Assistant Examiner—Joni B. Danganan
(74) Attorney, Agent, or Firm—Bernard M. Weiss

(57) ABSTRACT

This invention relates to an improved jack bit comprised of a tubular jack actuator for driving a scissor or screw type jack and a shaft having a curved latch end engaged within the jack actuator for effecting rotation of the jack actuator. The improvement resides in a centering barrel slidably carried on the shaft and within the jack actuator whereby on rotation of the shaft by a power driver, the centering barrel provides for smooth and continuous transfer of energy of the shaft engaged with the jack actuator.

6 Claims, 3 Drawing Sheets

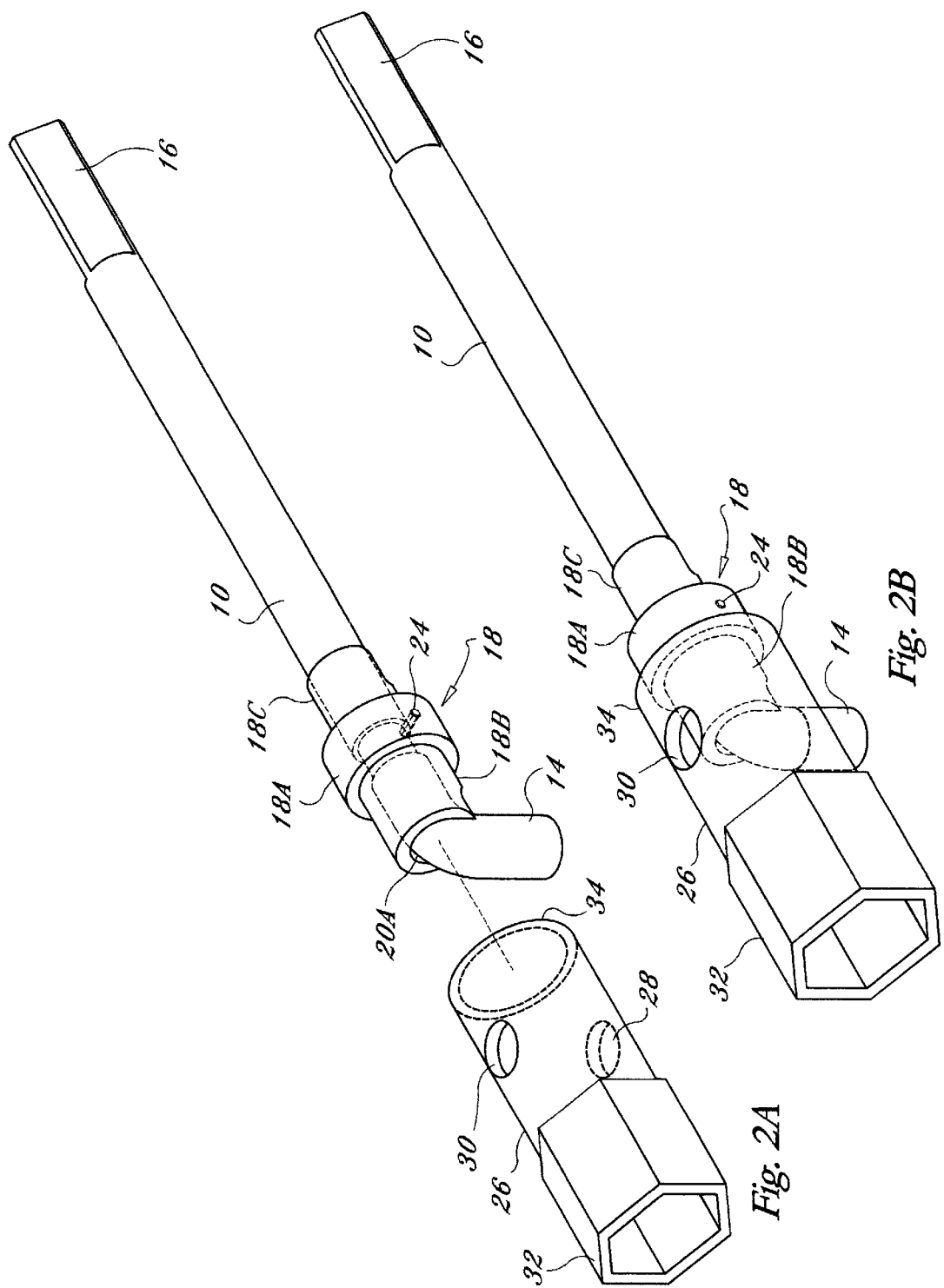

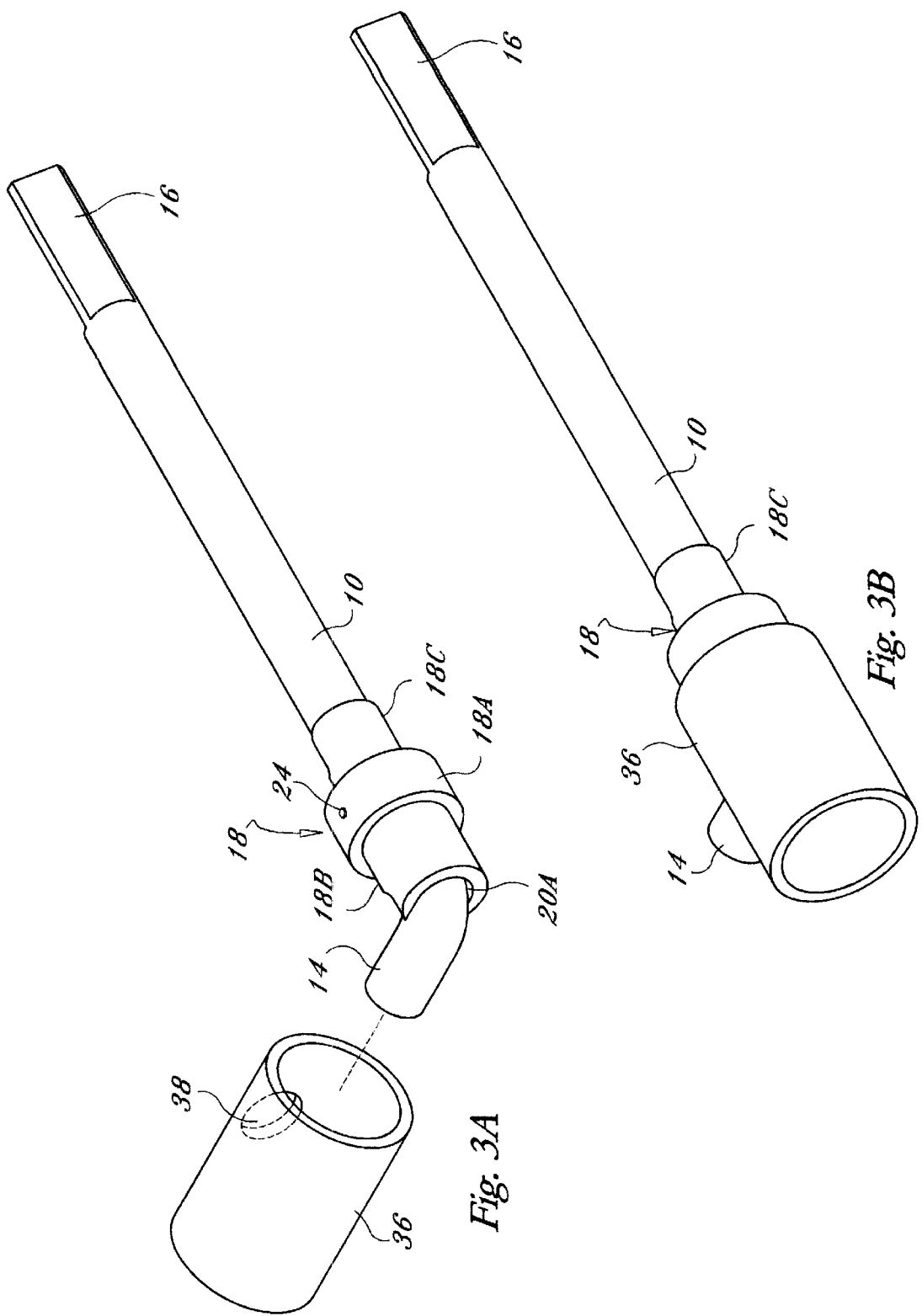

JACK BIT FOR ACTUATING SCISSOR JACKS ON TRAILERS

FIELD OF INVENTION

This invention generally relates to stabilizing and leveling jacks, specifically to a jack bit used for raising or lowering actuating jacks from a remote location with a power driver.

BACKGROUND OF THE INVENTION

Generally Recreational Vehicles and Concession Trailers are installed with scissor or screw type jacks. These jacks are connected to the frame of the trailer and are used for leveling and stabilizing. The main operation or actuation of the jack is accomplished by the use of a manually operated hand crank. The hand crank is physically challenging, time consuming and burdensome especially to those who frequently raise and lower multiple jacks.

There are known attempts to reduce the manual labor required in raising and lowering jacks as listed in U.S. Pat. Nos. 5,897,121 and 6,237,894 by providing a chuck adapter for use with power drivers to transfer energy for actuation. Although both reduce the manual labor involved in raising and lowering jacks, they are limited and have not taken into consideration the varying speed ranges of the power driver. As seen in the present invention, the centering barrel provides safety for all ranges of speed and can even be easily used by the elderly and disabled that are capable of using a power driver.

SUMMARY

In accordance with the present invention a jack bit is provided as an adapter that allows the safe transfer of rotational energy from a power driver with varying speed ranges to a jack actuator coupling.

Several objects and advantages of the present invention are:

a) To provide a tool bit that along with the use of a power driver actuates the raising or lowering of the scissor jacks.

b) To provide a jack bit with safety features enabling its operation by the elderly and disabled.

c) To provide a jack bit that can quickly and easily be inserted and retracted into/onto a jack actuator from a remote location.

d) To provide a jack bit with a solid shaft and centering device that transfers balanced rotational energy from the power source to the trailer jack at all speeds.

e) To provide a jack bit that is designed to operate safely with increased rotational speed ranges that a power driver can produce.

f) To provide a jack bit that is designed to be commercially viable.

g) To provide a jack bit that adapts to different actuators and heads for flexibility.

h) To provide a jack bit that can be operated at significantly higher speeds reducing workforce labor costs.

DRAWINGS

In the drawings, closely related figures have the same number but different alphabetic suffixes.

FIG. 2A is a perspective view of the connected shaft, centering barrel and a socket attachment.

FIG. 2B is perspective view of the shaft, the centering barrel and the socket attachment.

FIG. 3A is a perspective view of the present invention and a trailer jack actuator coupling at the start of connection.

FIG. 3B is a perspective view of the present invention and the trailer jack actuator coupling at final connection.

Figures 1A, 1B:
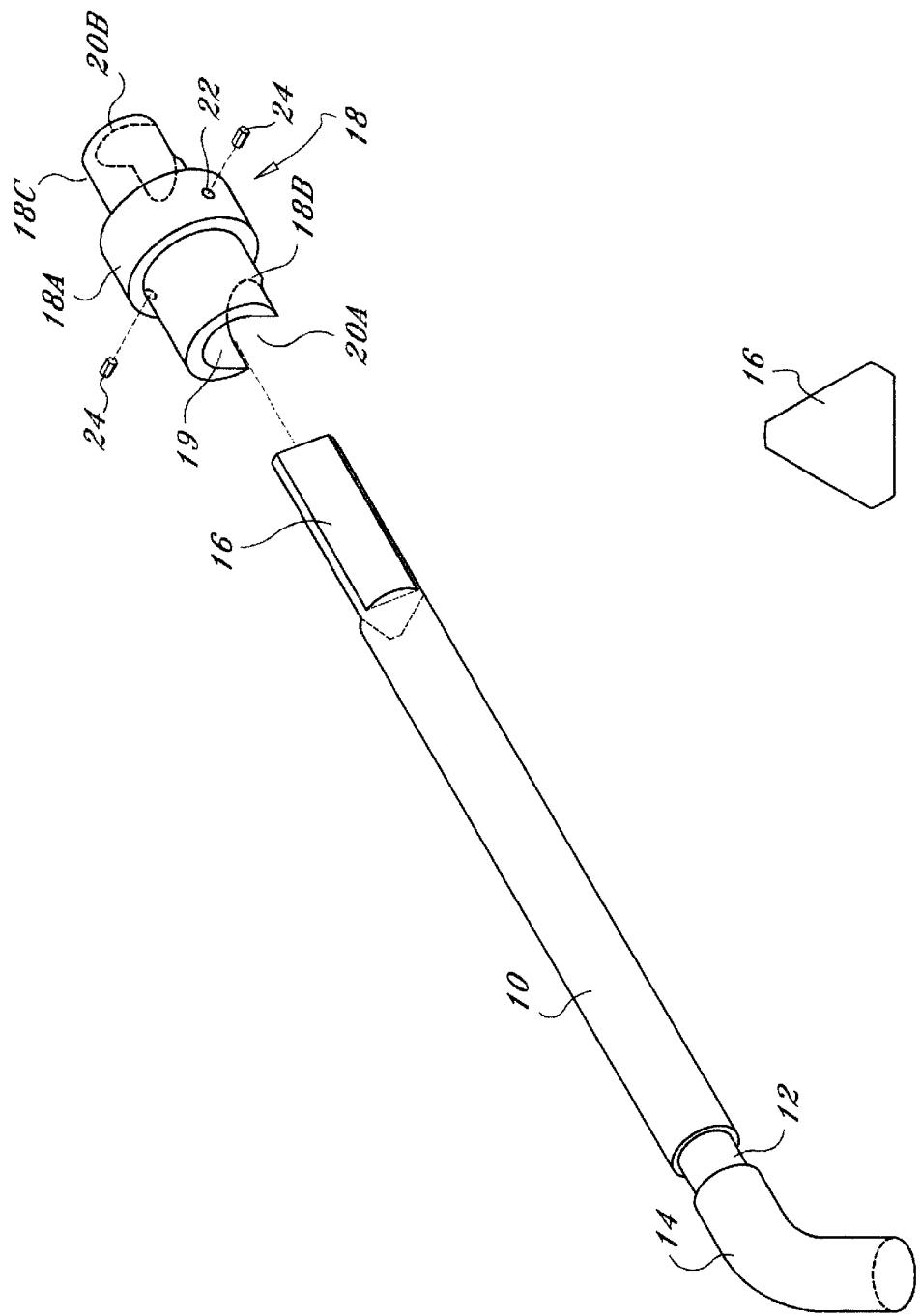
FIG. 1A is a perspective view of a shaft and a centering barrel of the present invention.
FIG. 1B is an end view of a bit.

| |
|---|
| 10 Shaft |
| 12 Ward |
| 14 Curved Latch |
| 16 Bit |
| 18 Centering Barrel |
| 18A Middle Core |
| 18B Large End |
| 18C Small End |
| 19 Bore Hole |
| 20A Barrel Notch |
| 20B Barrel Notch |
| 22 Screw Hole |
| 24 Set Screw |
| 26 Socket Attachment |
| 27 Latch Hole |
| 30 Debris Relief |
| 32 Hex Tool |
| 34 Receiver |
| 36 Jack Actuator |
| 38 Tool Hole |

DETAILED DESCRIPTION OF THE INVENTION

Description-FIGS. 1A, 1B, 2A, 2B, 3A, and 3B—Preferred Embodiment

A preferred embodiment of the present invention is illustrated in FIG. 1A. The interlocking and construction of the present invention will be made clear in further illustrations.

FIG. 1A is a perspective view of the present invention that has two main parts, a shaft (10) and a centering barrel (18). The shaft (10) is elongated with a diameter of ⅜" and a horizontal length of 6" that has a curved latch (14) and a bit (16) and is constructed from one piece, the curved latch (14) has a 90° angle and extends ¾" from the center of the horizontal plane of the shaft (10) to the end of the curved latch (14), the opposing end is the bit (16) which has three flat sides cut into the ⅜" shaft (10) and is shaped with the same angles of a triangle, each flat side having a width of 0.21" and a horizontal length of 1.25", a ward (12) having a width of 0.15" and a depth of 0.01" is cut into the ⅜" shaft (10) and is 0.98" from the horizontal end of the curved latch (14) and is continuous around the circumference of the shaft (10). The centering barrel (18) has a middle core (18A) with a diameter of 0.75", a horizontal length of 0.50", and opposing ends, a large end (18B) having a diameter of 0.60", a horizontal length of 0.50" with a barrel notch (20A) that has a horizontal cut depth of 0.30"and width of 0.38", a small end (18C) having a diameter of 0.50" with a horizontal length of 0.50" with a barrel notch (20B) that has the same cut measurements of the barrel notch (20A), the centering barrel (18) also has a bore hole (19) that extends horizontally through the center of the centering barrel (18), and has a diameter of 0.38" to 0.39" and a threaded screw hole (22) with a set screw(24) centered on the middle core (18A) that extends through the bore hole (19).

FIG. 1B is an end view of the bit (16) that has three flat cuts into the diameter of the ⅜" shaft (10).

FIG. 2A is a perspective view of the preferred embodiment of the present invention with a socket attachment (26)

made of one solid piece of tubing, with a horizontal length of 2.5", an outside diameter of 0.75", and an inside diameter of 0.61", that has opposing ends, a hex tool (32) that is formed by a machine press and dye, with six equal flat sides that are approximately 0.50" deep and a receiver (34), having opposing holes, a latch hole (28), and a debris relief (30), both having a diameter of 0.46" and are horizontally 0.58" from the receiver (34).

FIG. 2B is a perspective view of the socket attachment (26) interlocked with the preferred embodiment of the present invention.

FIG. 3A is a perspective view of the preferred embodiment of the present invention and a jack actuator (36) with a single tool hole (38).

FIG. 3B is a perspective view of the preferred embodiment of the present invention fully inserted into the tool hole (38) of the jack actuator (36).

Advantages

From the description above, a number of advantages of the invention become evident:

a) By using a solid shaft to transfer energy from a supplied power source to the actuator of a trailer jack the energy is constant and more direct.

b) With transferring energy through only one solid piece, demand/stress on materials are less, enabling the use of smaller diameter materials.

c) Smaller diameter materials enable the jack bit to be manufactured cheaper and the use of the jack bit easier on the operator and equipment.

d) A centering barrel allows the shaft to be positioned in the center axis of the trailer jack actuator which when in operation provides a smooth and continuous transfer of energy.

e) The centering barrel only allows the curved latch end of the shaft to extend outside of the side hole of the jack actuator at a minimum distance through all ranges of speed without unexpected movements.

f) With the shaft being one piece and the centering barrel interlocked when inserted into the trailer jack actuator the jack bit is safe with main parts of the jack bit encased and locked inside of actuator.

g) The jack bit is a one step interconnection to the jack actuator and is ready for use.

h) With the jack bit being centered and locked inside the jack actuator, higher speeds of rotation can safely be used.

i) A socket attachment provides a wide variety of options to fit most trailer jacks.

j) The socket attachment is manufactured by use of a press, reducing cost.

k) The socket attachment has a debris relief hole to remove dirt and road material that builds up on hex head trailer jack actuators.

l) The socket attachment when interlocked to the present invention acts as one piece, making it secure and safe to use.

m) Two set screws when tightened are locked in the ward which will not allow the centering barrel to slide or move, and the set screws are counter sunk below the surface of the centering barrel when tightened eliminating the possibility of snaring anything while in operation.

n) By operating the jack bit at higher speeds causes the dirt and road surface grime to be expelled from the screw part of the trailer jack by means of centrifugal force, keeping the jack clean thus, providing better operation.

o) The triangular shaped bit end is machined so as to engage the jaws of the chuck of the power driver to prevent slippage yet retain its structural stability.

Operation—FIGS. 1A, 1B, 2A, 2B, 3A, and 3B

The manner of using the jack bit to raise and lower trailer jacks that have a cup shaped end with one hole in the sidewall of the jack actuator (36).

First determine which end of the centering barrel (18) is the appropriate size to fit the trailer jack actuator. Next, slide the centering barrel (18) onto the bit end (16) until the barrel notch (20A) or (20B) aligns with the curved latch (14), at this point, the two set screws (24) are tightened locking them into the ward (12) and countersinking them below the surface of the centering barrel (18).

To operate, secure the bit (16) into the chuck of a power driver and insert the curved latch (14) into the tool hole (38) of the jack actuator (36) at a 45° angle until the curved latch (14) is completely extended through the tool hole (38), while, simultaneously decreasing the angle of the jack bit until the preferred end of the centering barrel (18) has slipped inside the jack actuator (36) and the jack bit is horizontal with the jack actuator (36), then apply rotational power with a power driver or another power source. The forward motion of the power driver lowers the trailer jack, while reversing the direction raises the trailer jack.

The Manner of Using the Jack Bit on a Hexagonal Jack Actuator

One must first loosen the set screws (24) of the centering barrel (18) so that it slides slightly down the shaft (10) to allow the curved latch (14) to slide into the latch hole (28) on the receiver (34) of the socket attachment (26) at a 45° angle until the curved latch (14) is completely extended through the latch hole (28), while simultaneously decreasing the angle until the socket attachment (26) and the shaft (10) are horizontally aligned. Next slide the large end (18B) of the centering barrel (18) inside the socket attachment (26) until the middle core (18A) butts against the receiver (34). Then, tighten the set screws (24) to secure the socket attachment (26).

CONCLUSION, RAMIFICATIONS, AND SCOPE

Accordingly, the solid shaft and centering barrel of the jack bit provides a smoother, convenient, easier and safer way of transferring energy to raise and lower trailer jacks. In addition the socket attachment gives the jack bit versatility to connect with almost all stabilizer and leveling jacks on recreational vehicles and concession trailers. Furthermore, the jack bit has the additional advantage in that It is smaller, lighter, and faster which make the jack bit practical and commercially viable to the market place;

It permits use of smaller voltages of rotational power such as 12 or 18 volt power drivers;

It allows for engraving on the shaft for personalized or brand name identification;

It allows for different types of metals to be used such as, steel, iron, galvanized iron, etc.;

It permits for coloring pigments to be added to the metals used in manufacturing for eye appeal.

Although the description above contains many specific details, these should not be construed as limiting the scope of the invention but as merely providing illustrations of some of the presently preferred embodiments of the invention. For example, the shaft and the centering barrel as well as the socket attachment may be made larger, shorter, of a smaller diameter, having different ends, of a lighter or stronger material, and they may be forged from a solid piece of material.

Thus, the scope of the invention should be determined by the appended claims and their legal equivalents, rather than by the examples given.

Wherefore I claim:

1. In an apparatus for actuating a scissor jack's activating means said apparatus comprised of a tubular jack actuator having a first end adapted for engagement with the activating means for said scissor jack and a second end adapted for engagement with a shaft having a curved latch end for effecting rotation of said tubular jack actuator, said curved latch end extending into the interior of said tubular jack actuator, and then through a side hole in the wall of said jack actuator, whereby when the shaft is rotated said jack actuator is rotated and said scissor jack activated, the improvement which comprises:

a tubular centering barrel slidably carried on said shaft and extending into the interior of said tubular jack actuator;

retaining means for retaining said tubular centering barrel within the interior of said tubular jack actuator; and, a bit end on said shaft opposite the curved latch end and adapted for communication with drive means.

2. The apparatus of claim 1 wherein the tubular centering barrel has a barrel notch adapted for engagement with said curved latch end.

3. The apparatus of claim 2 wherein the centering barrel has a middle core extending about the circumference of the centering barrel for abutting the second end of said jack actuator.

4. The apparatus of claim 3 wherein the shaft has an indented ward area and the retaining means for retaining the centering barrel within the jack actuator is a screw in communication with said indented ward area.

5. The apparatus of claim 4 wherein the first end of said jack actuator terminates in a socket.

6. The apparatus of claim 2 wherein the end opposite the curved latch end on said shaft is triangular shaped and adapted for engagement with a power driver.

* * * * *